US011700603B2

(12) United States Patent
Li et al.

(10) Patent No.: US 11,700,603 B2
(45) Date of Patent: Jul. 11, 2023

(54) APPARATUS AND METHOD FOR SCHEDULED UPLINK MULTI-USER ACCESS WITH CONCURRENT PEER-TO-PEER COMMUNICATIONS

(71) Applicant: Apple Inc., Cupertino, CA (US)

(72) Inventors: Guoqing Li, Campbell, CA (US); Lawrie Kurian, San Jose, CA (US); Yong Liu, Campbell, CA (US); Tashbeeb Haque, San Francisco, CA (US); Anand Rajagopalan, Saratoga, CA (US); Dagbegnon H. Bahini, Livermore, CA (US); Rajneesh Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 932 days.

(21) Appl. No.: 16/262,402

(22) Filed: Jan. 30, 2019

(65) Prior Publication Data

US 2020/0008210 A1 Jan. 2, 2020

Related U.S. Application Data

(60) Provisional application No. 62/691,522, filed on Jun. 28, 2018.

(51) Int. Cl.
*H04W 72/12* (2023.01)
*H04W 72/04* (2023.01)
(Continued)

(52) U.S. Cl.
CPC ..... *H04W 72/121* (2013.01); *H04W 72/1263* (2013.01); *H04W 72/21* (2023.01);
(Continued)

(58) Field of Classification Search
CPC ........... H04W 72/121; H04W 72/1257; H04W 72/1263; H04W 84/12; H04W 72/048;
(Continued)

(56) References Cited

U.S. PATENT DOCUMENTS

2007/0258365 A1* 11/2007 Das ................... H04W 72/21
370/230
2015/0351125 A1 12/2015 Kwon et al.
(Continued)

OTHER PUBLICATIONS

Cariou et al., U.S. Appl. No. 62/687,129 for US 2019/0306685 A1, filed Jun. 19, 2018; specification and drawings. (Year: 2018).*
(Continued)

*Primary Examiner* — Faisal Choudhury
(74) *Attorney, Agent, or Firm* — Sterne, Kessler, Goldstein & Fox P.L.L.C.

(57) ABSTRACT

Some embodiments include an apparatus and method for enabling concurrent peer-to-peer (P2P) communications via a scheduled resource unit (RU) allocated by an access point (AP). For example, the AP may use a trigger frame to schedule uplink (UL) multi-user (MU) access for a first station of a plurality of stations by allocating an RU to the first station. Instead of using the allocated RU for UL infrastructure communications with the AP, the first station may utilize the allocated RU for a P2P communications with a second station. In some embodiments the AP facilitates RU utilization for P2P communications between stations. In some embodiments, the first station uses the allocated RU and the AP may be unaware of the P2P communications.

20 Claims, 11 Drawing Sheets

(51) Int. Cl.
  *H04W 72/121* (2023.01)
  *H04W 72/1263* (2023.01)
  *H04W 72/21* (2023.01)
  *H04W 72/23* (2023.01)
  *H04W 72/51* (2023.01)
  *H04W 72/50* (2023.01)
  *H04W 72/566* (2023.01)
  *H04W 92/18* (2009.01)
  *H04W 84/12* (2009.01)

(52) U.S. Cl.
  CPC .......... *H04W 72/23* (2023.01); *H04W 72/51* (2023.01); *H04W 72/535* (2023.01); *H04W 72/569* (2023.01); *H04W 84/12* (2013.01); *H04W 92/18* (2013.01)

(58) Field of Classification Search
  CPC ......... H04W 72/1242; H04W 72/1284; H04W 72/1289
  USPC ....................................... 370/329
  See application file for complete search history.

(56) References Cited

U.S. PATENT DOCUMENTS

| | | | |
|---|---|---|---|
| 2016/0165653 A1* | 6/2016 | Liu | H04W 72/12 370/329 |
| 2016/0255647 A1* | 9/2016 | Zhu | H04W 72/20 370/329 |
| 2017/0265135 A1 | 9/2017 | Cariou et al. | |
| 2017/0332385 A1* | 11/2017 | Shirali | H04W 72/21 |
| 2018/0020372 A1 | 1/2018 | Viger et al. | |
| 2018/0027453 A1* | 1/2018 | Viger | H04W 72/1289 370/336 |
| 2018/0091256 A1 | 3/2018 | Sutskover | |
| 2019/0045537 A1* | 2/2019 | Seok | H04W 72/0446 |
| 2019/0124556 A1* | 4/2019 | Verma | H04W 28/26 |
| 2019/0306685 A1* | 10/2019 | Cariou | H04W 72/0446 |
| 2019/0357143 A1* | 11/2019 | Wang | H04W 52/0229 |

OTHER PUBLICATIONS

Office Action directed to related Chinese Patent Application No. 201910477883, dated Jun. 4, 2022, with attached English-language translation; 5 pages.

* cited by examiner

APPARATUS AND METHOD FOR SCHEDULED UPLINK MULTI-USER ACCESS WITH CONCURRENT PEER-TO-PEER COMMUNICATIONS

CROSS-REFERENCE TO RELATED APPLICATIONS

This application claims benefit of U.S. Provisional Application No. 62/691,522, filed on Jun. 28, 2018, entitled, Apparatus and Method for Scheduled Uplink Multi-User Access with Concurrent Peer-to-Peer Communications, which is incorporated herein by reference in its entirety.

BACKGROUND

Field

The described embodiments generally relate to channel access in wireless communications.

Related Art

An access point (AP) typically uses a higher priority to access a wireless local area Network (WLAN) medium than a WLAN station. Thus, the WLAN medium can be occupied by infrastructure traffic transmitted and received by the AP for an extended amount of time. In some cases a WLAN station may have urgent peer-to-peer (P2P) traffic to transmit to a peer device where the P2P traffic has a higher priority than pending infrastructure traffic. But, due to the AP's higher channel access priority than the WLAN station, or a congested WLAN medium, the WLAN station cannot send the P2P traffic to the peer device in a timely manner.

SUMMARY

Some embodiments include an apparatus and method for enabling concurrent peer-to-peer (P2P) communications via a scheduled resource unit (RU) allocated by an access point (AP). A resource unit may be: a frequency resource such as a frequency segment out of the total bandwidth (BW) that can be used by devices in the network; a spatial resource such as one or more spatial streams that can be used by devices in the network; or a combination of both frequency and spatial resources such as a combination of a frequency segment(s) and spatial streams out of the total BW that can be used by devices in the network. The RU allocation may be used by a station to access a wireless local area Network (WLAN) medium. For example, the AP may use a trigger frame to schedule uplink (UL) multi-user (MU) access for a first station of a plurality of stations by allocating an RU to the first station. Instead of using the allocated RU for UL infrastructure communications with the AP, the first station may utilize the allocated RU for a P2P communications with a second station. In some embodiments the AP facilitates utilization of the allocated RU for P2P communications between stations. In some embodiments, the first station uses the allocated RU for P2P communications instead of infrastructure communications, and the AP may be unaware of the P2P communications.

In some embodiments, a station receives a trigger frame from an AP that indicates an RU is allocated to the station for transmitting infrastructure traffic to the AP, and the station determines based on an RU usage policy, whether to transmit P2P traffic utilizing the allocated RU to a second electronic device. The RU usage policy may include: infrastructure traffic priority or P2P traffic priority; a size of infrastructure traffic queued or P2P traffic queued; a maximum queuing time for infrastructure traffic or P2P traffic; and/or RU allocation details.

The station may receive an indication of a P2P concurrency capability from an AP, and transmit an indication that the station is capable of P2P operation using UL MU communications. The station may transmit a buffer status report (BSR) for P2P traffic (e.g., Neighbor Awareness Networking (NAN) traffic) to the AP where the BSR indicates P2P traffic being present. The AP may use the BSR received to create a second trigger frame, and the second trigger frame may indicate that a second allocated RU can be used for P2P traffic. In some embodiments the P2P traffic is based on NAN protocol, Apple Wireless Direct Link (AWDL) protocol, or WiFi Direct protocol. In some embodiments the station may use a block acknowledgement request (BAR) to poll an acknowledgement for the P2P traffic transmitted utilizing the allocated RU. Using a BAR instead of an immediate ACK may avoid collisions with an immediate acknowledgement (ACK) that the AP may transmit.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
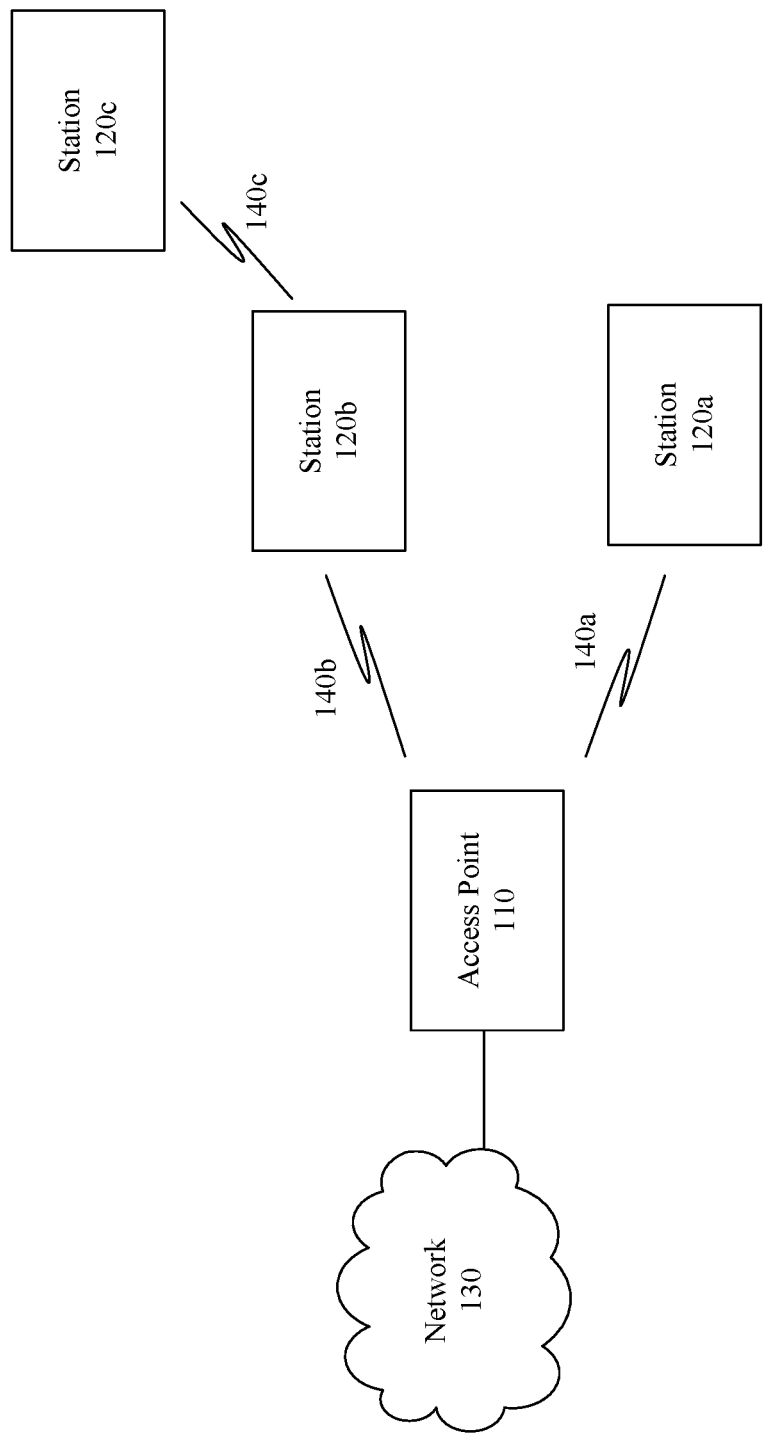
FIG. 1 illustrates an example system implementing scheduled uplink (UL) multi-user (MU) access with concurrent peer-to-peer communications, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A station such as a wireless local area network (WLAN) station may transmit infrastructure traffic via an access point (AP) and transmit peer-to-peer (P2P) traffic with a peer device which may be another station. But, due to the AP's higher channel access priority than the station or a congested WLAN medium, the station may not send P2P traffic in a timely manner, even if the P2P traffic queued at the station has a higher priority than the infrastructure traffic queued at the station.

Some embodiments enable concurrent P2P communications via a scheduled resource unit (RU) allocated by an AP. For example, the AP may use a trigger frame to schedule uplink (UL) multi-user (MU) access for a first station of a plurality of stations by allocating an RU to the first station. Instead of using the allocated RU for UL infrastructure communications with the AP, the first station may utilize the allocated RU for a P2P communications with a second station. In some embodiments the AP facilitates RU utilization for P2P communications between stations. In some embodiments, the first station uses the allocated RU without facilitation (e.g., the AP may be unaware of the P2P communications.) Examples of the P2P protocols may include but are not limited to Neighbor Awareness Networking (NAN), Apple Wireless Direct Link (AWDL), and WiFi Direct. Throughout this disclosure, NAN protocol is used as a non-limiting example.

FIG. 1 illustrates an example system 100 implementing a scheduled UL MU access with concurrent peer-to-peer communications, according to some embodiments of the disclosure. Example system 100 is provided for the purpose of illustration only and is not limiting of the disclosed embodiments. System 100 may include but is not limited to stations 120, access point (AP) 110, and network 130. Stations 120a-120c may include but are not limited to WLAN stations such as wireless communication devices, smart phones, laptops, desktops, tablets, personal assistants, monitors, and televisions. Stations 120 may support latency sensitive applications (e.g., video and/or audio streaming). AP 110 may include but are not limited to WLAN electronic devices such as a wireless router, a wearable device (e.g., a smart watch), a wireless communication device (e.g., a smart phone), or a combination thereof. Network 130 may be the Internet and/or a WLAN. Station 120 communications are shown as wireless communications 140.

Figure 11:
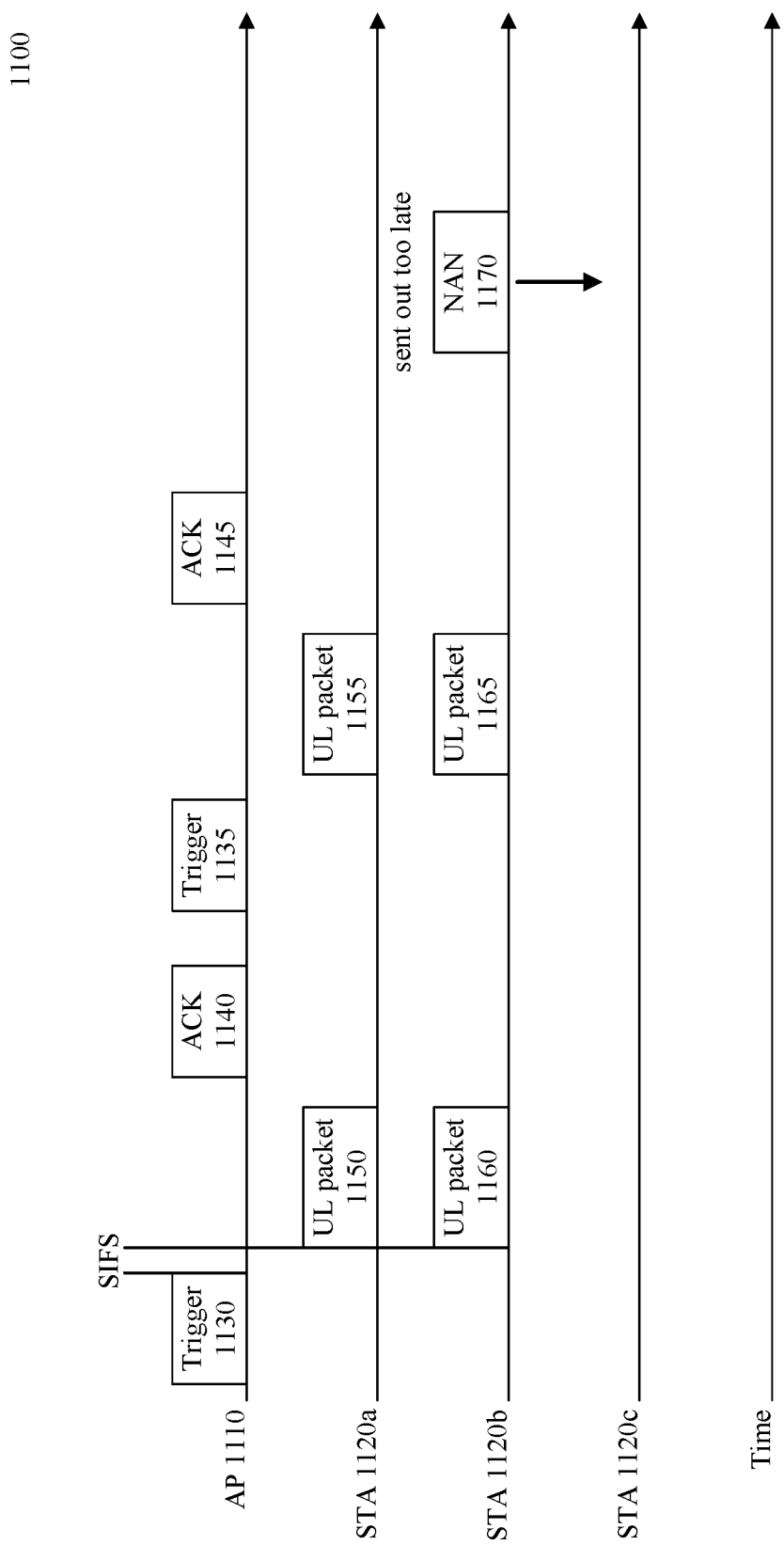
FIG. 11 illustrates an example wireless system that cannot transmit peer-to-peer communications in a timely manner.

FIG. 11 illustrates an example wireless system 1100 that cannot transmit peer-to-peer communications in a timely manner. As a convenience and not a limitation, FIG. 11 may be described with regard to elements of FIG. 1. For example, AP 1110 may be similar to AP 110 of FIG. 1 and stations 1120a-1120c may similar to be stations 120a-120c. In example wireless system 1100, AP 1110 may transmit trigger frame 1130, and after a short interframe space (SIFS), stations 1120a and 1120b may transmit respective UL packets 1150 and 1160 according to the information in trigger frame 1130, where UL packets 1150 and 1160 include infrastructure traffic directed to AP 1110. AP 1110 then transmits an acknowledgment (ACK) 1140.

Station 1120b may establish a P2P connection with station 1120c and may have time critical P2P traffic queued to be sent to station 1120c, where the P2P traffic queued has a higher priority than any infrastructure traffic queued to be sent to AP 1110. But, when AP 1110 transmits trigger frame 1135, stations 1120a and 1120b respond accordingly with UL packets 1155 and 1165 that include infrastructure traffic to AP 1110. When station 1120b finally obtains a transmission opportunity (e.g., by contention window count down), station 1120b may transmit a P2P packet (e.g., NAN packet 1170) to station 1120c. The problem is that NAN packet 1170 may be transmitted too late. A late NAN packet 1170 transmission may result in for example, a poor user experience for users of stations 1120c and/or 1120b.

Figure 2:
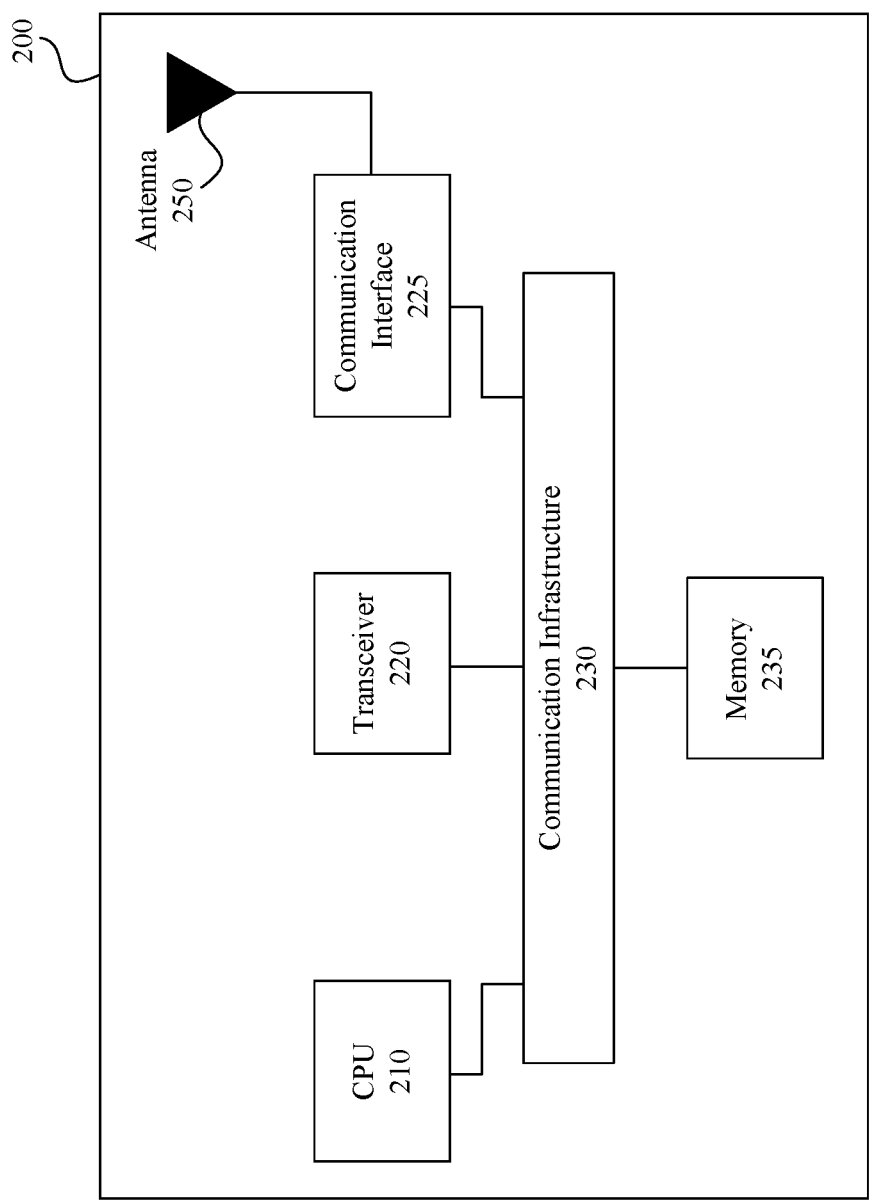
FIG. 2 illustrates a block diagram of an example wireless system supporting scheduled UL MU access with concurrent peer-to-peer (P2P) communications, according to some embodiments of the disclosure.

FIG. 2 illustrates a block diagram of an example wireless system 200 supporting scheduled uplink multi-user access with concurrent peer-to-peer communications, according to some embodiments of the disclosure. System 200 may be any of the electronic devices (e.g., stations 110, access point 120) of system 100. System 200 includes central processing unit (CPU) 210, transceiver 220, communication interface 225, communication infrastructure 230, memory 235, and antenna 250. Memory 235 may include random access memory (RAM) and/or cache, and may include control logic (e.g., computer software) and/or data. CPU 210 together with instructions stored in memory 235 performs operations enabling scheduled uplink multi-user access with concurrent peer-to-peer communications. In some embodiments CPU 210 and instructions in memory 235 together perform operations enabling scheduled uplink multi-user access with concurrent peer-to-peer communications. Transceiver 220 transmits and receives communications signals that support scheduled uplink multi-user access with concurrent peer-to-peer communications, and may be coupled to antenna 250. Communication interface 225 allows system 200 to communicate with other devices that may be wired and/or wireless. Communication infrastructure 230 may be a bus. Antenna 250 may include one or more antennas that may be the same or different types.

Figure 3:
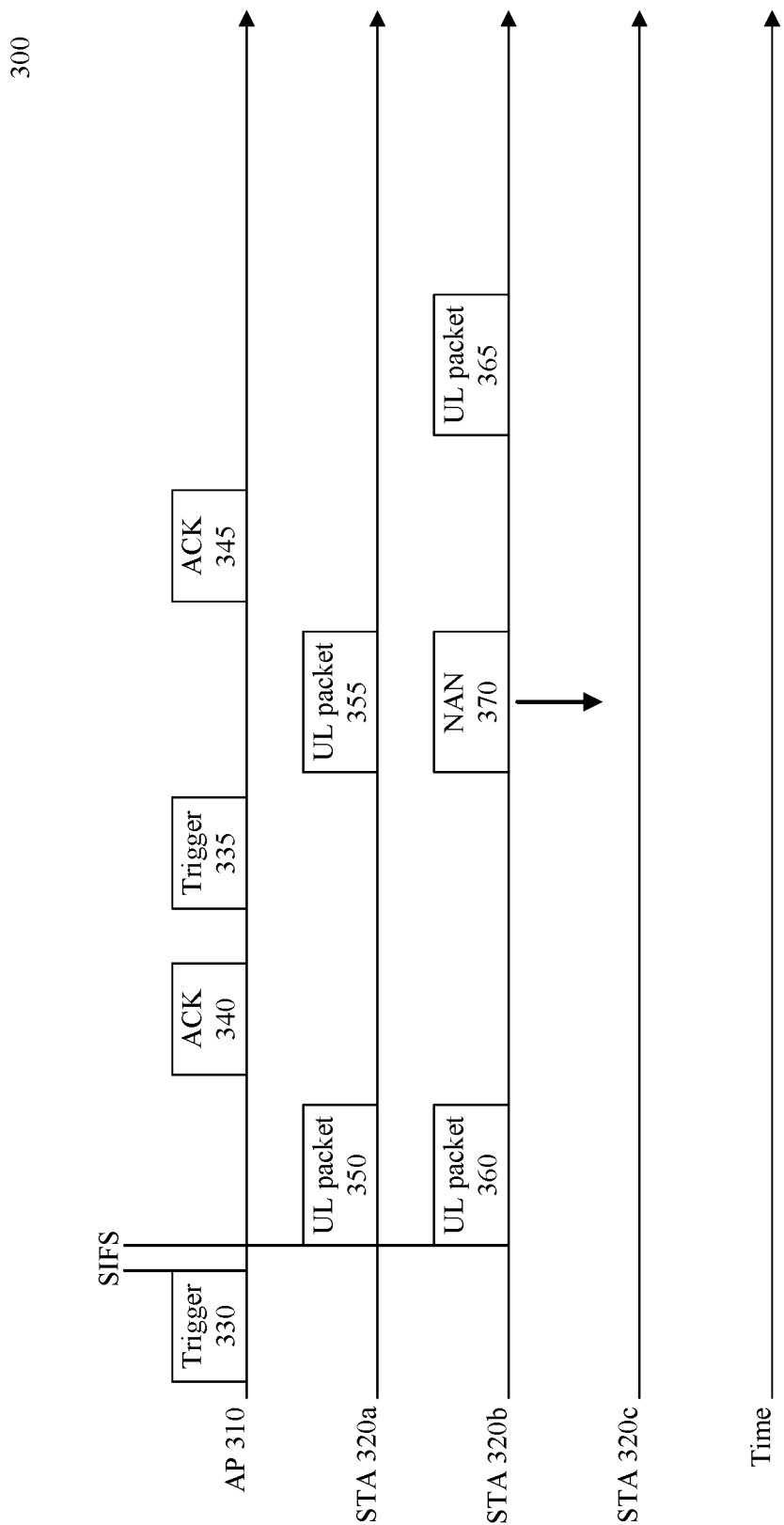
FIG. 3 illustrates an example wireless system supporting scheduled UL MU access with concurrent P2P communications, according to some embodiments of the disclosure.

FIG. 3 illustrates an example wireless system 300 supporting scheduled UL MU access with concurrent peer-to-peer communications, according to some embodiments of the disclosure. As a convenience and not a limitation, FIG. 3 may be described with regard to elements of FIG. 1. For example, AP 310 may be similar to AP 110 of FIG. 1 and stations 320a-320c may similar to be stations 120a-120c. In example wireless system 300, AP 310 schedules UL MU access to the WLAN medium by allocating RUs in frequency and time domain for multiple associated stations 320 (e.g., station 320a and 320b). When an RU is allocated to a station 320, the station 320 may transmit infrastructure traffic UL in their RU allocation. An example of an RU is an orthogonal frequency-division multiple access (OFDMA) RU. In wireless system 300, AP 310 informs stations 320a and 320b of the following: their RU allocations, decoding parameters that a particular station(s) 320 uses to decode their RU allocations, as well as their UL MU transmission parameters via trigger frame 330. Examples of UL MU transmission parameters include but are not limited to transmission (Tx) duration, modulation and coding scheme (MCS), a number of spatial streams ($N_{SS}$), Tx power, and other parameters as described in IEEE 802.11ax.

After a short interframe space, stations 320a and 320b may transmit respective UL packets 350 and 360 according to the RU allocation in trigger frame 330, where UL packets 350 and 360 include infrastructure traffic directed to AP 310. Subsequently, AP 310 transmits an acknowledgment (ACK 340.)

Station 320b may establish a P2P connection with station 320c and may have time critical P2P traffic (e.g., P2P packets) queued to be sent to station 320c, where the P2P traffic queued has a higher priority than any infrastructure traffic queued to be sent to AP 310. Examples of the P2P traffic may include video and/or audio data that is being communicated between stations 320b and 320c.

Peer devices may establish an RU usage policy that enables a first peer device to determine whether to utilize scheduled UL MU access for concurrent P2P communications with a second peer device, or for infrastructure communications with an AP. The RU usage policy may be based on any/all of: pending infrastructure traffic priority, pending P2P traffic priority, infrastructure traffic queue size, P2P traffic queue size, maximum queuing time for current infrastructure traffic, maximum queuing time for current P2P traffic, RU allocation details, and/or an RU Usage Agreement established with a peer device. Examples of RU allocation details include an MCS and/or a duration of an RU allocation. For example, if a P2P traffic priority is higher than an infrastructure traffic priority and/or the P2P traffic queuing time has satisfied a given threshold value, then the peer device (e.g., WLAN station) may choose to use the RU allocated by the AP to transmit P2P traffic to a peer.

In example wireless system 300, a station 320 can utilize their OFDMA RU allocated from AP 310 to transmit P2P traffic to a peer device instead of using their OFDMA RU allocation to transmit UL infrastructure traffic to AP 310. For example, AP 310 transmits trigger frame 335 that includes station identifiers, RU allocations and corresponding decoding parameters, as well as transmission parameters for each of stations 320a and 320b. Station 320a utilizes the RU allocated to station 320a to transmit infrastructure traffic in UL packet 355 to AP 310. In some embodiments, station 320b utilizes the RU allocated to station 320b to transmit P2P traffic (e.g., NAN packet 370) to a peer device, station 320c. In other words, station 320b transmits P2P traffic within an UL OFDMA packet where the P2P traffic is addressed to station 320c. Subsequently, station 320b may transmit UL infrastructure traffic at a later time as shown by UL packet 365, via regular channel access (e.g., contention based access) or after another trigger frame (not shown.)

Figure 9:
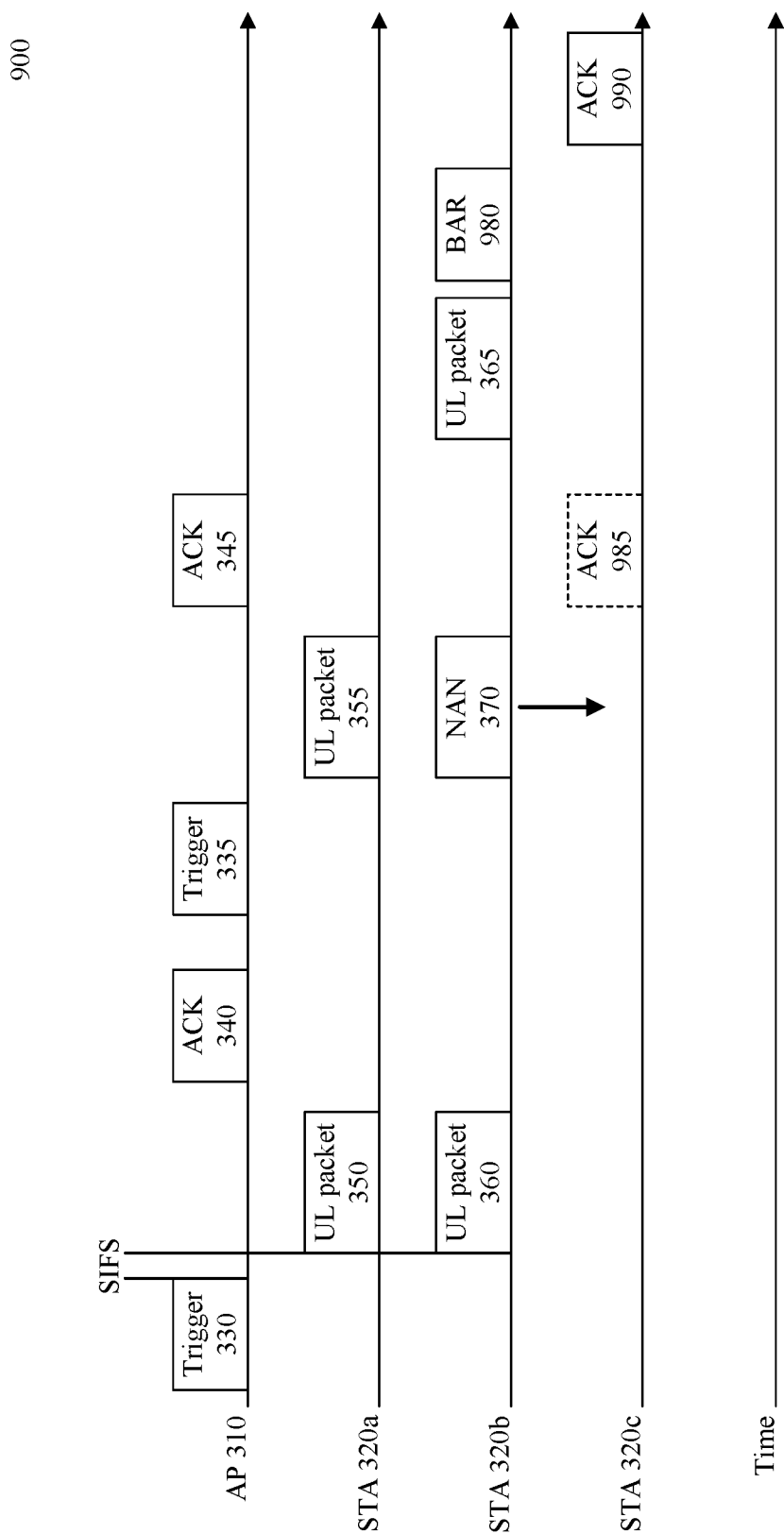
FIG. 9 illustrates an example wireless system with an acknowledgement policy supporting scheduled uplink multi-user access with concurrent peer-to-peer communications, according to some elements of the disclosure.

In some embodiments peer devices of a P2P communication establish acknowledgement policies among themselves to avoid transmitting acknowledgements that may collide with acknowledgements transmitted by an AP. The ACK policy may prevent a recipient peer device from transmitting an immediate ACK in response to receiving P2P packets transmitted in a scheduled UL MU access. Peer devices may establish an acknowledgement policy to use a delayed acknowledgement such as a block acknowledgement request (BAR) to poll for acknowledgements to P2P packets transmitted in a scheduled UL MU access. FIG. 9 illustrates an example wireless system 900 with an acknowledgement policy supporting scheduled UL MU access with concurrent peer-to-peer communications, according to some elements of the disclosure. As a convenience and not a limitation, FIG. 9 may be described with regard to elements of FIG. 3.

As shown in example wireless system 900, after station 320c receives P2P traffic (e.g, NAN 370) from station 320b, station 320c does not send an immediate ACK 985 that may collide with ACK 345 sent by AP 310 to acknowledge the infrastructure packets that AP 310 received in the UL MU transmissions (e.g., UL packet 355.) Peer devices 320b and 320c may establish an ACK policy to use a BAR to obtain acknowledgements for P2P packets transmitted in UL MU. As an example, after station 320b transmits P2P traffic (e.g., NAN 370) to station 320c, station 320b may subsequently transmit BAR 980 to poll for an acknowledgement corresponding to NAN 370. Station 320c may transmit ACK 990 in response.

Figure 4:
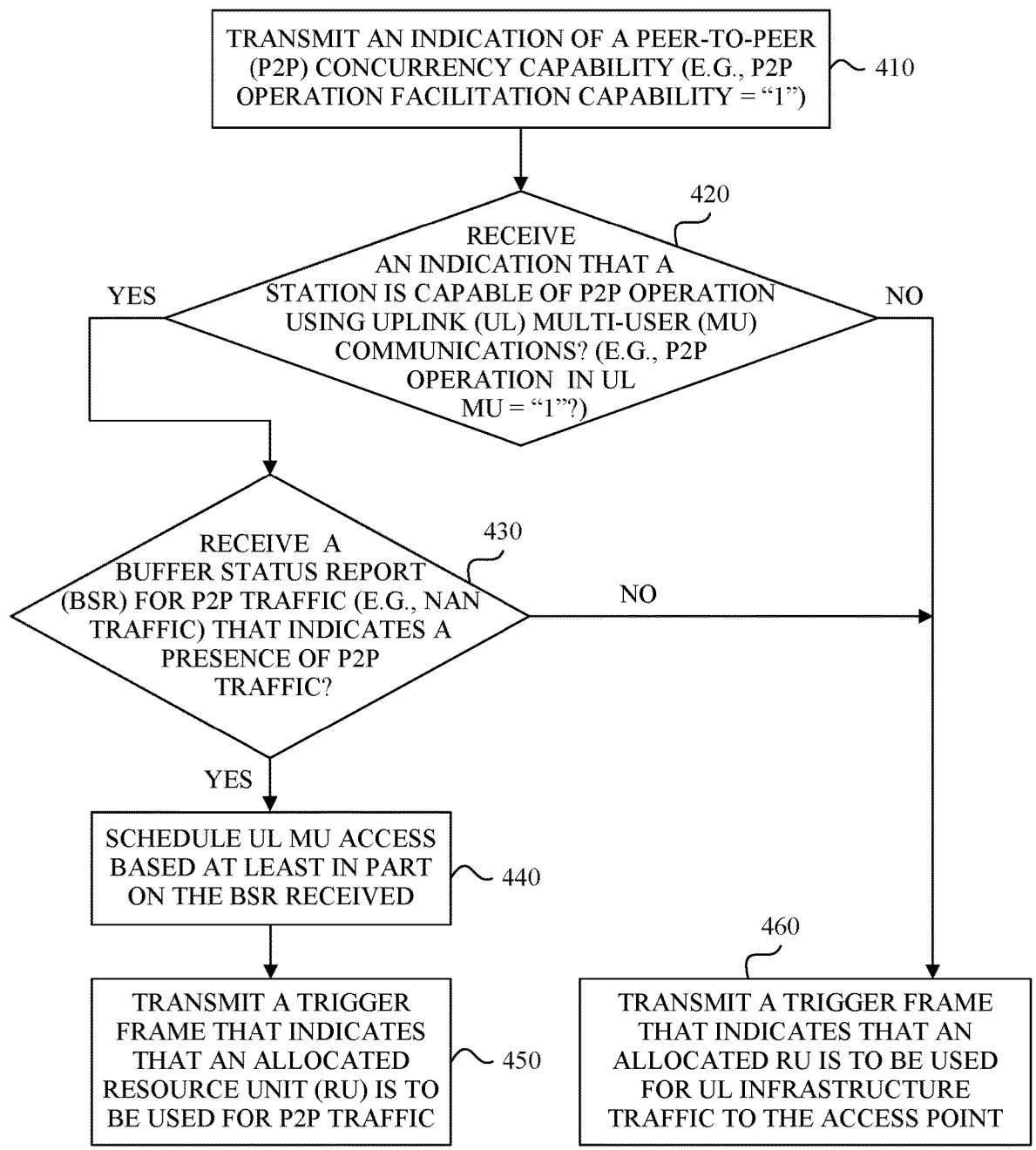
FIG. 4 illustrates an example method for an access point supporting scheduled UL MU access with concurrent P2P communications, according to some embodiments of the disclosure.

In some embodiments an AP facilitates utilization of allocated RUs for P2P communications between stations. FIG. 4 illustrates an example method 400 for an AP supporting scheduled UL MU access with concurrent peer-to-peer communications, according to some embodiments of the disclosure. As a convenience and not a limitation, FIG. 4 may be described with regard to elements of FIGS. 1-3. Method 400 may be performed by an AP such as AP 110 of FIG. 1, AP 310 of FIG. 3, system 200 of FIG. 2 or computer system 1000 of FIG. 10, to facilitate utilization of allocated RUs for P2P communications.

At 410, system 200 transmits an indication of a (P2P) concurrency capability that system 200 can enable P2P traffic transmission in an UL MU transmission. For example, AP 110 may transmit a capability field called a "P2P operation facilitation capability", and the capability field may be transmitted in a Beacon. When the value of the "P2P operation facilitation capability" is set to "1", a receiving station (e.g., station 120b) can use an RU allocated by AP 110 for either infrastructure traffic intended for the AP or for P2P traffic intended for another station.

At 420, system 200 receives an indication of whether a station is capable of P2P operation using UL MU communications, or not. For example, AP 110 may receive a capability field called "P2P operation in UL MU" from station 120b, and the capability field may be received in a (Re)Association Response. When "P2P operation in UL MU" is set to "1" station 120b is capable of using an RU allocated by AP 110, to transmit P2P traffic (e.g., transmit P2P traffic to station 120c) and method 400 proceeds to 430. Otherwise, method 400 proceeds to 460.

At 430, system 200 receives a buffer status report (BSR) for P2P traffic (e.g., NAN traffic) that may indicate presence of P2P traffic. For example, if AP 110 receives a BSR for P2P traffic from station 120b, where the P2P traffic is separate from infrastructure traffic, or the P2P traffic may be aggregated with infrastructure traffic as an aggregated BSR, method 400 proceeds to 440. Some embodiments include using an IEEE 802.11ax BSR to indicate a presence of P2P traffic (e.g., P2P link traffic.) Otherwise, the BSR may indicate a presence of only infrastructure traffic and method 400 proceeds to 460.

At 440, system 200 schedules UL MU access based at least in part on the BSR received to support the P2P traffic. For example, AP 110 may determine RU allocations, decoding parameters, and/or transmission parameters based at least in part on the BSR received from station 120b.

At 450, system 200 transmits a trigger frame that indicates that an allocated resource unit (RU) is to be used for P2P traffic. For example, AP 110 may transmit the trigger frame that includes an "allocation policy" field. When the "allocation policy" field is set to "1", station 120b may utilize the RU allocated to transmit P2P traffic (e.g., to transmit P2P traffic to station 120c).

At 460, system 200 schedules UL MU access based at least in part on the BSR received that includes information regarding infrastructure traffic. For example, AP 110 may determine RU allocations, decoding parameters, and/or transmission parameters based at least in part on the BSR received from station 120*b*. System 200 transmits a trigger frame that indicates that an allocated RU is to be used for UL infrastructure traffic to system 200. For example, AP 110 may transmit a trigger frame where the "allocation policy" field is set to "0" to station 120*b*. Subsequently, station 120*b* utilizes the RU allocated to transmit UL infrastructure traffic to AP 110.

Figure 5:
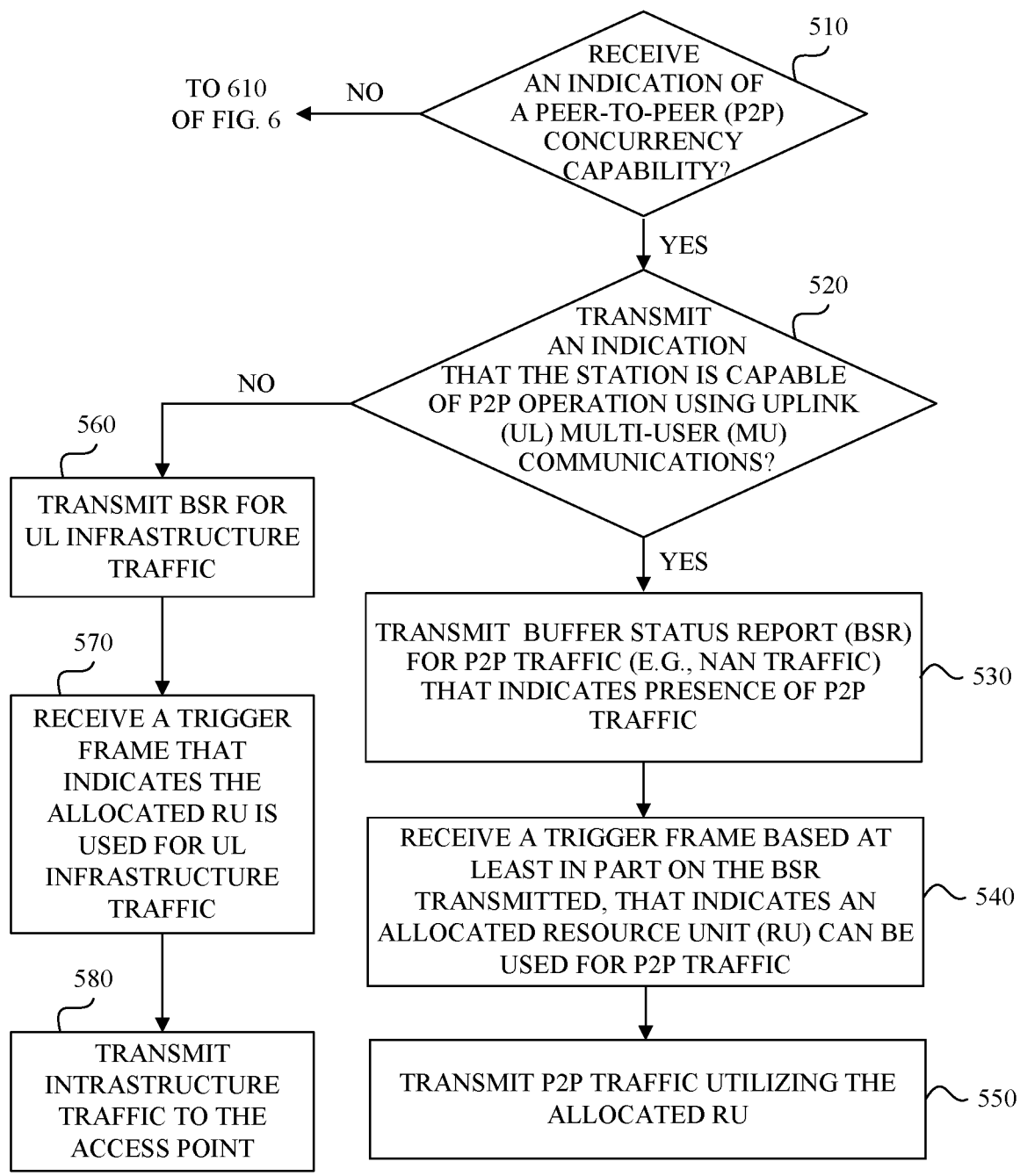
FIG. 5 illustrates an example method for a station supporting scheduled UL MU access with concurrent P2P communications, according to some embodiments of the disclosure.

FIG. 5 illustrates an example method 500 for a station supporting scheduled UL MU access with concurrent peer-to-peer communications, according to some embodiments of the disclosure. As a convenience and not a limitation, FIG. 5 may be described with regard to elements of FIGS. 1-4. Method 500 may be performed by a station such as station 120 of FIG. 1, station 320 of FIG. 3, system 200 of FIG. 2 or computer system 1000 of FIG. 10, to facilitate utilization of allocated RUs for P2P communications.

At 510, system 200 may receive an indication of a P2P concurrency capability that indicates whether an AP (e.g., AP 110 of FIG. 1 or AP 310 of FIG. 3) can enable P2P traffic transmission in an UL MU transmission. For example, station 120*b* may receive a capability field called a "P2P operation facilitation capability", and the capability field may be received in a Beacon from AP 110. When the value of the "P2P operation facilitation capability" is set to "1", AP 110 informs station 120*b* that AP 110 can allocate an RU for either: infrastructure traffic intended for AP 110, or for P2P traffic intended for another station 120*c*, and method 500 proceeds to 520. When the value of the "P2P operation facilitation capability" is set to "0", AP 110 informs station 120*b* that AP 110 only allocates RUs for UL infrastructure traffic, and method 500 proceeds to 610 shown in FIG. 6.

At 520, system 200 transmits an indication of whether system 200 is capable of P2P operation using uplink (UL) multi-user (MU) communications. For example, station 120*b* may transmit a capability field called "P2P operation in UL MU" to AP 110, and the capability field may be transmitted in a (Re)Association Response. When "P2P operation in UL MU" is set to "1", station 120*b* informs AP 110 that station 120*b* is capable of using an RU allocated by AP 110 for P2P traffic to transmit P2P traffic (e.g., transmit P2P packets to station 120*c*), and method 500 proceeds to 530. When P2P operation in UL MU is set to "0", station 120*b* indicates that station 120*b* only uses an RU allocated by AP 110 to transmit infrastructure traffic, and method 500 proceeds to 560.

At 530, system 200 transmits a buffer status report (BSR) for P2P traffic (e.g., NAN traffic) that indicates a presence of P2P traffic to an AP. For example, when station 120*b* transmits a BSR for P2P traffic to AP 110, where the P2P traffic may be separate from infrastructure traffic, or the P2P traffic may be aggregated with infrastructure traffic as an aggregated BSR, method 500 proceeds to 540. Some embodiments include using an IEEE 802.11ax BSR to indicate a presence of P2P traffic (e.g., P2P link traffic).

At 540, system 200 receives a trigger frame from the AP based at least in part on the BSR transmitted at 530 that indicates that an allocated resource unit (RU) can be used for P2P traffic. For example, station 120*b* receives the trigger frame from AP 110 that includes an "allocation policy" field, where AP 110 may determine the value of "allocation policy" based at least in part on the value of "P2P operation in UL MU" (from 520) and/or the BSR transmitted from station 120*b* (from 530). The "allocation policy" field is set to "1", and station 120*b* may utilize the RU allocated to transmit P2P traffic (e.g., to transmit P2P traffic to station 120*c*.)

At 550, system 200 transmits P2P traffic utilizing the allocated RU. For example, station 120*b* (or station 320*b*) may utilize the RU that AP 110 (or AP 310) allocated for station 120*b* (or station 320*b*) to transmit P2P traffic (e.g., NAN packet 370) to a peer device, station 120*c* (or station 320*c*.)

At 560, system 200 may transmit a BSR for only UL infrastructure traffic (e.g., system 200 has no P2P traffic to send.)

At 570, system 200 may receive a trigger frame from the AP based at least in part on the BSR transmitted at 560 that indicates that an allocated RU can be used for infrastructure traffic. For example, station 120*b* receives the trigger frame from AP 110 that includes an "allocation policy" field, where AP 110 may determine the value of "allocation policy" based at least in part on the value of "P2P operation in UL MU" (from 520) and/or the BSR transmitted from station 120*b* (from 530). The "allocation policy" field is set to "0", and station 120*b* can only utilize the RU allocated to transmit UL infrastructure traffic to AP 110.

At 580, system 200 transmits infrastructure traffic utilizing the allocated RU. For example, station 120*b* (or station 320*b*) may only utilize the RU that AP 110 (or AP 310) allocated for station 120*b* (or station 320*b*) to transmit UL infrastructure traffic to AP 110 (or AP 310.)

Figure 6:
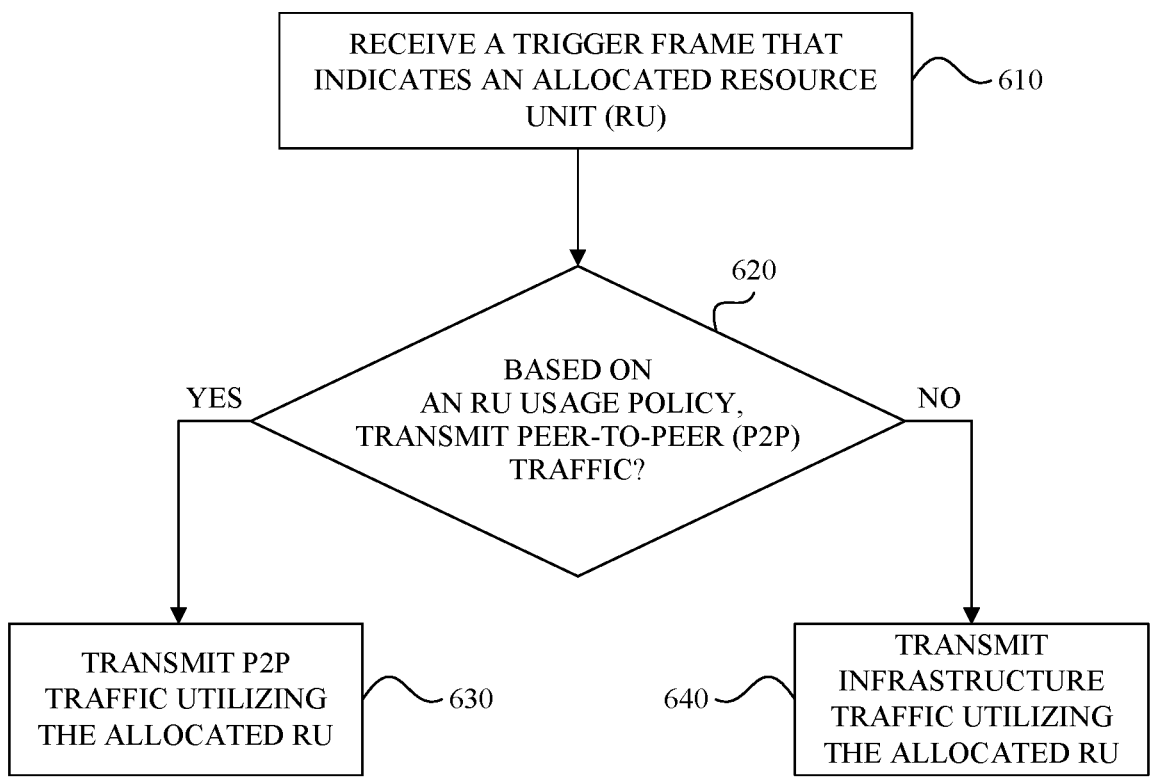
FIG. 6 illustrates another example method for a station supporting scheduled UL MU access with concurrent P2P communications, according to some embodiments of the disclosure.

In some embodiments, a station does not exchange P2P concurrency capabilities (e.g., "P2P operation facilitation capability" and/or "P2P operation in UL MU") or BSR with an AP. Instead, a station uses an allocated RU for P2P traffic, and the AP may be unaware of the P2P communications. FIG. 6 illustrates another example method 600 for a station supporting scheduled UL MU access with concurrent peer-to-peer communications, according to some embodiments of the disclosure. As a convenience and not a limitation, FIG. 6 may be described with regard to elements of FIGS. 1-5. Method 600 may be performed by a station such as station 120 of FIG. 1, station 320 of FIG. 3, system 200 of FIG. 2 or computer system 1000 of FIG. 10, to facilitate utilization of allocated RUs for P2P communications.

At 610, system 200 receives a trigger frame from an AP that includes an allocated RU that is intended to be used transmitting infrastructure traffic to the AP. For example, station 120*b* receives a trigger frame from AP 110 that identifies an RU allocated for station 120*b* for transmitting infrastructure traffic. System 200 may receive the trigger frame from AP 110 as a result of a "NO" decision of 510 of FIG. 5 where AP 110 may be an older version AP that cannot support the P2P concurrency. AP 110 may be unaware of any P2P communications for station 120*b*. In another example, system 200 may receive the trigger frame from AP 110 such as at 570 of FIG. 5, where AP 110 is P2P concurrency capable and allocates an RU for UL infrastructure traffic.

At 620, system 200 determines based on an RU usage policy, whether to transmit P2P traffic utilizing the allocated RU or whether to transmit infrastructure traffic utilizing the allocated RU. Station 120*b* can determine how to use the RU, even if AP 110 allocated the RU for UL infrastructure traffic (e.g., at 570 of FIG. 5). In other words, based on the RU policy, Station 120*b* can utilize an RU that is allocated for UL infrastructure traffic for P2P traffic, and AP 110 may be unaware of the utilization of the allocated RU for P2P traffic.

When system 200 determines to transmit P2P traffic using the allocated RU, method 600 proceeds to 640. When system 200 determines to transmit UL infrastructure traffic to the AP, method 600 proceeds to 640.

At 630, system 200 transmits P2P traffic utilizing the allocated RU. For example, station 120b may transmit P2P traffic to station 120c using the allocated RU.

At 640, system 200 transmits UL infrastructure traffic utilizing the allocated RU. For example, station 120b may transmit infrastructure traffic uplink to AP 110.

Using a P2P RU mapping table enables a peer device (e.g., station 320c of FIG. 3) to receive transmissions from its peers (e.g., station 320b) via RUs allocated by an AP (e.g., AP 110) to its peer (e.g., station 320b.) Stations transmitting UL packets do not transmit transmission parameters in UL packet headers because the AP that receives the UL packets has access to the transmission parameters including the parameters needed for decoding transmissions sent in UL RU allocations. Thus, to obtain the decoding parameters needed for decoding RU allocations, a peer device creates and populates a P2P RU mapping table based on information in a received trigger frame.

A peer device may be able to process more than one RU at a time, and the processing may be in parallel. Peer devices may exchange RU Usage Agreements to control how many RU allocations they may receive at a time. Alternatively, without exchanging an RU Usage Agreement, a peer device may choose which RU allocation they will process and which RU allocations they will ignore.

Figure 7:
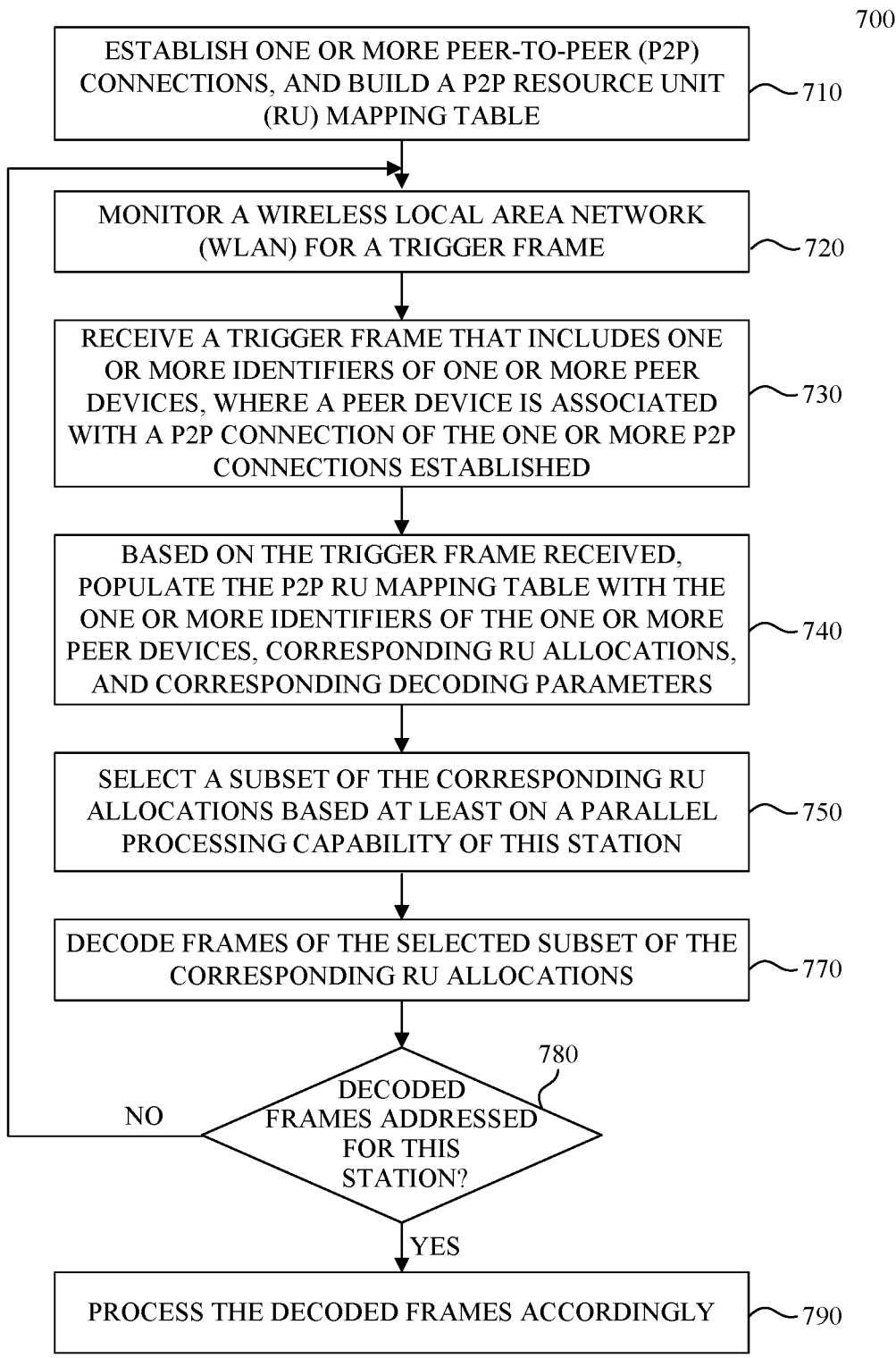
FIG. 7 illustrates an example method for a peer device supporting scheduled UL MU access with concurrent P2P communications without a resource unit (RU) Usage Agreement, according to some embodiments of the disclosure.

FIG. 7 illustrates an example method 700 for a peer device supporting scheduled UL MU access with concurrent P2P communications without an RU Usage Agreement, according to some embodiments of the disclosure. As a convenience and not a limitation, FIG. 7 may be described with regard to elements of FIGS. 1-6. Method 700 may be performed by a peer device such as stations 120b and 120c of FIG. 1, stations 320b and 320c of FIG. 3, system 200 of FIG. 2 or computer system 1000 of FIG. 10, to facilitate utilization of allocated RUs for P2P communications. Method 700 may be performed when the AP facilitates RU utilization for P2P communications between stations (see FIGS. 4 and 5) or when a station uses allocated RU for P2P traffic without the AP being aware (see FIG. 6.)

At 710, system 200 establishes one or more P2P connections, and builds a P2P RU mapping table. The P2P RU mapping table may include an identifier for each peer device with which system 200 has established a P2P connection. System 200 may be station 320c. For example, station 320c may establish a P2P connection with station 320b and five other stations 320 (not shown.)

At 720, system 200 monitors a WLAN for a trigger frame.

At 730, system 200 receives a trigger frame that includes one or more identifiers of one or more peer devices, where a peer device is associated with a P2P connection of the one or more P2P connections established. For example, station 320c may receive a trigger frame (e.g., trigger frame 335 of FIG. 3) that includes an identifier of station 320b and four of the five other stations 320.

At 740, based at least on the trigger frame received, system 200 populates the P2P RU mapping table with the one or more identifiers of the one or more peer devices, corresponding RU allocations, and corresponding decoding parameters (e.g., modulation coding scheme (MCS), forward error correction (FEC), dual carrier modulation (DCM.)) In this example, trigger frame 335 includes RU allocations for station 320b and the four other stations 320. Thus, station 320c may create a P2P RU mapping table including identifiers of a peer devices station 320b and the four other stations 320, corresponding RU allocations for the peer devices (e.g., station 320b and the four other stations 320), and corresponding RU allocation decoding parameters.

At 750, system 200 selects a subset of the corresponding RU allocations based at least on a parallel processing capability of system 200, and disregards the remaining RU allocations. For example, if system 200 can process N RU allocations at a time where N is an integer, system 200 selects N RU allocations from the P2P RU mapping table based on information received in trigger frame 335. In this example, N=2, and station 320c may select the RU allocation from station 320b and one station 320 of the four other stations 320 populated in the P2P RU mapping table. The remaining allocations for the three stations 320 are ignored.

At 770, system 200 decodes frames of the selected subset (e.g., N) of the corresponding RU allocations. For example, station 320c uses the decoding parameters in the P2P RU mapping table to decode two (e.g., N=2) RU allocations corresponding to station 320b, and the one station 320 of the four other stations 320 populated in the P2P RU mapping table.

At 780, system 200 determines whether the decoded frames are addressed for system 200. When the decoded frames are addressed for system 200 (e.g., station 320c, a peer device), method 700 proceeds to 790. When the decoded frames are not addressed for system 200 (e.g., the decoded frames may be addressed to AP 310 for infrastructure traffic, or to a different peer device), method 700 returns to 720 to monitor the WLAN for another trigger frame.

At 790, since the decoded frames are addressed to system 200, system 200 processes the decoded frames accordingly. For example, when the decoded frames are addressed to station 320c, station 320c can process the P2P traffic according to the P2P communications established with station 320b.

In some embodiments peer devices may establish a RU Usage Agreement with peer devices with which a P2P connection has been established. The RU Usage Agreement allows a peer device to determine ahead of time, from which peer devices the peer device will accept P2P communications in UL MU RU allocations.

Figure 8:
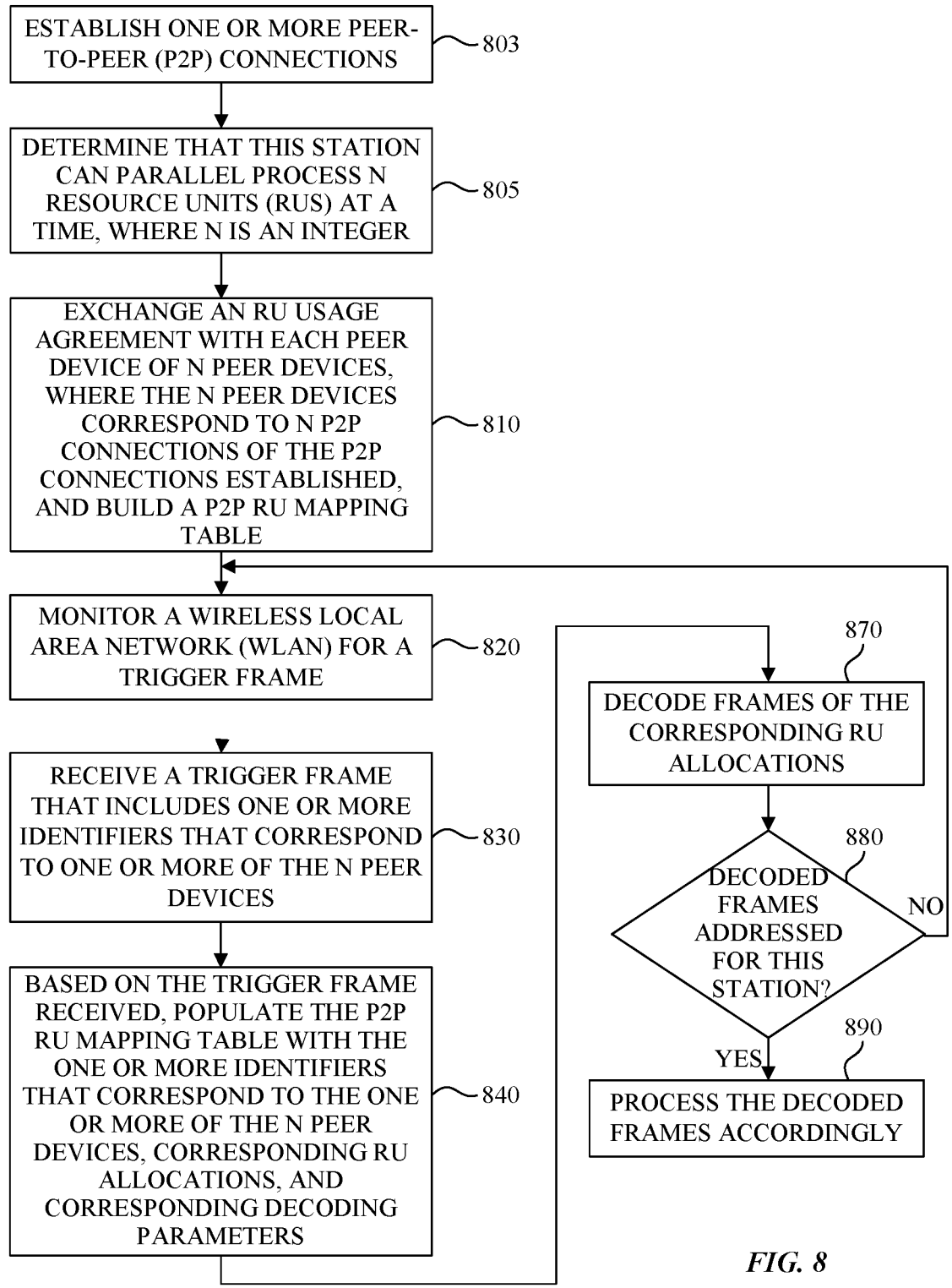
FIG. 8 illustrates an example method for a peer device supporting scheduled UL MU access with concurrent P2P communications with RU Usage Agreements, according to some embodiments of the disclosure.

FIG. 8 illustrates an example method 800 for a peer device supporting scheduled UL MU access with concurrent P2P communications with RU Usage Agreements, according to some embodiments of the disclosure. As a convenience and not a limitation, FIG. 8 may be described with regard to elements of FIGS. 1-7. Method 800 may be performed by a peer device such as stations 120b and 120c of FIG. 1, stations 320b and 320c of FIG. 3, system 200 of FIG. 2 or computer system 1000 of FIG. 10, to facilitate utilization of allocated RUs for P2P communications. Method 800 may be performed when the AP facilitates RU utilization for P2P communications between stations (see FIGS. 4 and 5) or when a station uses allocated RU for P2P traffic without the AP being aware (see FIG. 6.)

At 803, system 200 establishes one or more P2P connections. For example, system 200 may be station 320c that establishes a P2P connection with station 320b and five other stations 320 (not shown.)

At 805, system 200 determines that system 200 can parallel process N resource units (RUs) at a time, where N is an integer. In this example, N=2 so system 200 can process 2 resource unit allocations at a time (e.g., in parallel.)

At 810, system 200 exchanges an RU Usage Agreement with each peer device of N peer devices, where the N peer devices correspond to N P2P connections of the P2P connections established. System 200 also builds a P2P RU mapping table that identifies the N peer devices. The RU Usage Agreement ensures that at most, system 200 will process N RUs at a time, even if system 200 has P2P connections with more than N peer devices. In this example, station 320*c* exchanges an RU Usage Agreement with station 320*b* and the one station 320 of the other four stations 320. For example, a RU Usage Agreement enables RUs allocated by AP 310 for station 320*b* to be used for P2P communications from station 320*b* to station 320*c*. The RU Usage Agreement may also enable RUs allocated by AP 310 for station 320*c* to be used for P2P communications from station 320*c* to station 320*b*.

In some embodiments the peer device (e.g., station 320*c*) exchanges two management frames with each peer device (e.g., station 320*b* and the one station 320): an RU Usage Agreement request frame that includes an RU Usage Agreement information element (IE); and an RU Usage Agreement response frame that includes a status of the request. The status may be accept or reject. As an example, the RU Usage Agreement IE exchanged between the peer devices station 320*c* and 320*b* may include one or more of the following: an indication that station 320*c* is capable of using the RU allocated by AP 310 for station 320*b* to receive a P2P communication; an indication that station 320*c* is capable of using an RU allocated by AP 310 for station 320*c* to transmit a P2P communication to station 320*b*; a particular frequency segment in which an RU allocation may be used; and/or a specific basic service set ID (BSSID) in which an RU allocation may be used.

At 820, system 200 monitors a WLAN for a trigger frame.

At 830, system 200 receives a trigger frame that includes one or more identifiers that correspond to one or more of the N peer devices. For example, station 320*c* may receive a trigger frame 335 of FIG. 3 that includes an identifier of station 320*b* and the four other stations 320.

At 840, based on the trigger frame received, system 200 populates the P2P RU mapping table with the one or more identifiers that correspond to the one or more of the N peer devices, corresponding RU allocations, and corresponding decoding parameters. System 200 populates a P2P RU mapping table based on trigger frame 335 received. Even though trigger frame 335 may include RU allocations for more than the N peer devices, station 320*c* populates the information for the N peer devices with which RU Usage Agreements have been established, namely station 320*b* and the one station 320.

At 870, system 200 decodes frames of the corresponding N RU allocations. For example, station 320*c* uses the decoding parameters in the P2P RU mapping table to decode the two RU allocations corresponding to station 320*b* and the one station 320.

At 880, system 200 determines whether the decoded frames are addressed for system 200. When the decoded frames are addressed for system 200 (e.g., station 320*c*), method 800 proceeds to 890. When the decoded frames are not addressed for system 200 (e.g., the decoded frames may be addressed to AP 310 for infrastructure traffic, or to a different peer device), method 800 returns to 820 to monitor the WLAN for another trigger frame.

At 890, system 200 processes the decoded frames accordingly. For example, station 320*c* processes the decoded frames and confirms that the RU Usage Agreement IEs are satisfied. If for example, a BSSID or frequency segment of the RUs allocated do not correspond to the BSSID or the particular frequency segment noted in the RU Usage Agreement IE, then station 320*c* will not process the decoded frames.

Figure 10:
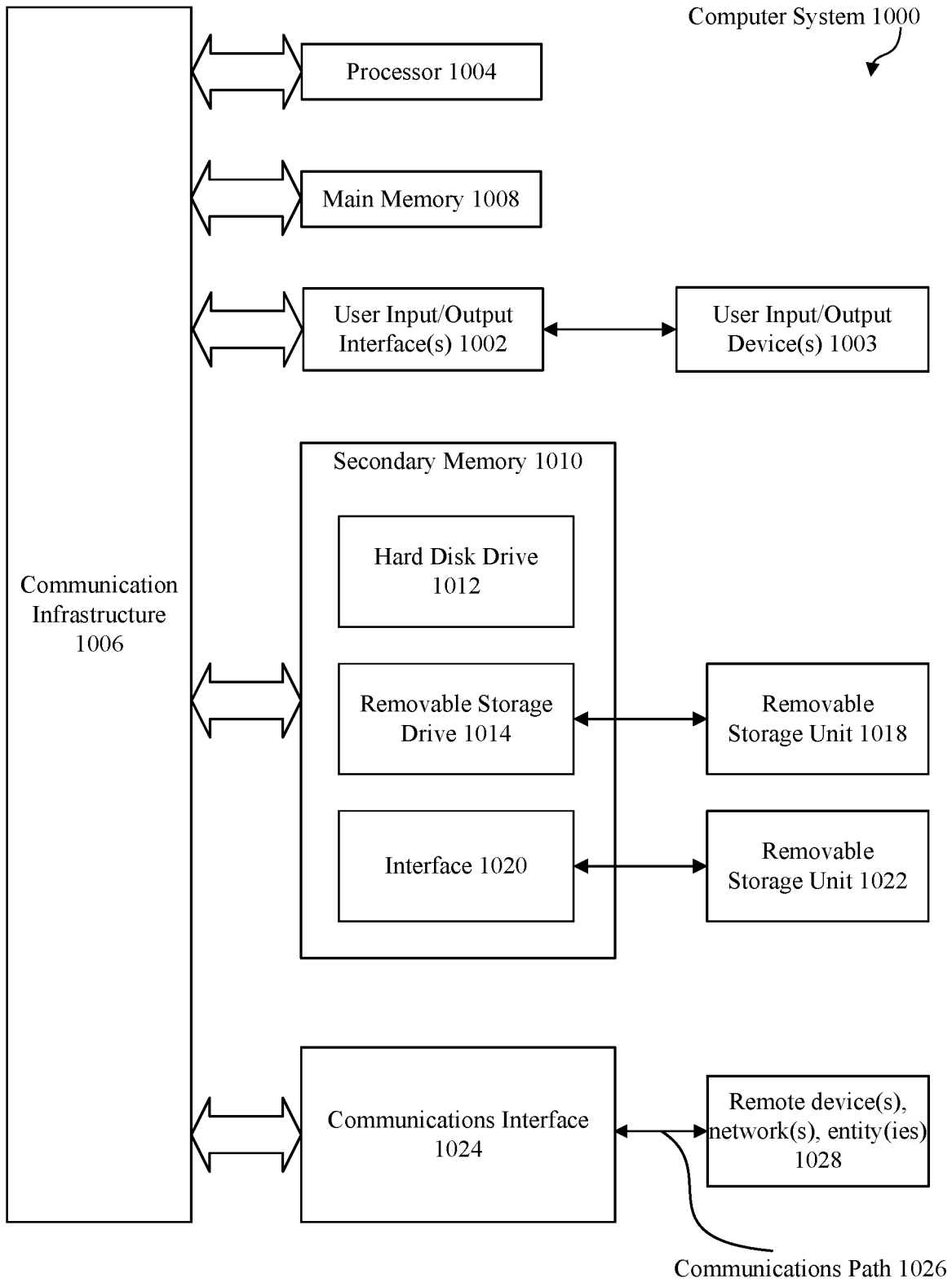
FIG. 10 is an example computer system for implementing some embodiments or portion(s) thereof.

Various embodiments can be implemented, for example, using one or more computer systems, such as computer system 1000 shown in FIG. 10. Computer system 1000 can be any well-known computer capable of performing the functions described herein. Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
   a transceiver configured to transmit and receive wireless communications; and
   one or more processors communicatively coupled to the transceiver and configured to:
   exchange a resource unit (RU) Usage Agreement with a second electronic device of N peer devices, wherein the electronic device can process N RUs at a time, where N is an integer;
   receive, from an access point, a trigger frame that identifies an RU allocated to the electronic device for transmitting infrastructure traffic to the access point;
   determine, based at least on an RU usage policy comprising the RU Usage agreement, whether to use the allocated RU to transmit peer-to-peer (P2P) traffic to the second electronic device; and
   transmit, using the transceiver, the P2P traffic to the second electronic device utilizing the allocated RU based at least on the determination.

2. The electronic device of claim 1, wherein the one or more processors are further configured to:
   receive a first indication from the access point of a peer-to-peer (P2P) concurrency capability; and
   transmit a second indication to the access point that the electronic device is capable of P2P operation using uplink (UL) multi-user (MU) communications.

3. The electronic device of claim 2, wherein the one or more processors are further configured to:
   transmit a buffer status report (BSR) to the access point that indicates a presence of second P2P traffic; and
   receive a second trigger frame based at least in part on the BSR, wherein the second trigger frame indicates that a second RU is allocated to be used for the second P2P traffic.

4. The electronic device of claim 1, wherein the P2P traffic uses a Neighbor Awareness Networking (NAN) protocol, an Apple Wireless Direct Link (AWDL) protocol, or a Wi-Fi Direct protocol.

5. The electronic device of claim 1, wherein the one or more processors are further configured to:
   use a block acknowledgement request (BAR) to poll an acknowledgement for the P2P traffic transmitted utilizing the allocated RU.

6. The electronic device of claim 1, wherein the RU usage policy is based at least on: infrastructure traffic priority or P2P traffic priority.

7. The electronic device of claim 1, wherein the RU usage policy is based at least on a size of: infrastructure traffic queued or P2P traffic queued.

8. The electronic device of claim 1, wherein the RU usage policy is based at least on a maximum queuing time for: the infrastructure traffic or the P2P traffic.

9. The electronic device of claim 1, wherein the RU usage policy is based at least on a modulation and coding scheme (MCS) of the RU allocation, or a duration of the RU allocation.

10. An electronic device, comprising:
    a transceiver configured to transmit and receive wireless communications; and
    one or more processors communicatively coupled to the transceiver and configured to:
    establish one or more peer-to-peer (P2P) connections;
    populate a P2P resource unit (RU) mapping table that includes: one or more identifiers corresponding to one or more respective peer devices, and one or more RU allocations with decoding parameters corresponding to the one or more identifiers, wherein the one or more respective peer devices are associated with the one or more established connections;

receive a trigger frame that includes information used to populate the P2P RU mapping table; and decode frames of the one or more RU allocations using corresponding decoding parameters.

11. The electronic device of claim 10, wherein the one or more processors are further configured to:

monitor a wireless local area network (WLAN) for the trigger frame, wherein the decoded frames of the one or more RU allocations comprise a selected subset of one or more RU allocations in the trigger frame received, and wherein the selected subset of one or more RU allocations is based on a parallel processing capability of the electronic device.

12. The electronic device of claim 11, wherein the one or more processors are further configured to:

determine that the decoded frames are addressed to the electronic device; and in response to the determination, process the decoded frames.

13. The electronic device of claim 10, wherein the one or more processors are further configured to:

determine that the electronic device can process N RUs at a time, where N is an integer; and exchange an RU Usage Agreement with a peer device of N peer devices, wherein the N peer devices correspond to the one or more respective peer devices of the P2P RU mapping table.

14. The electronic device of claim 13, wherein to exchange the RU Usage Agreement, the one or more processors are further configured to:

transmit to the peer device, an RU Usage Agreement request frame that includes an RU Usage Agreement information element (IE); and receive from the peer device, an RU Usage Agreement response frame that includes a status of the RU Usage Agreement request frame.

15. The electronic device of claim 14, wherein the RU Usage Agreement IE comprises at least one of: a first indication that the electronic device is capable of using a corresponding RU allocation for the peer device to receive a P2P communication; or a second indication that the electronic device is capable of using an RU allocation for the electronic device to transmit a P2P communication.

16. The electronic device of claim 14, wherein the RU Usage Agreement IE indicates a particular frequency segment in which an RU allocation may be used.

17. The electronic device of claim 14, wherein the RU Usage Agreement IE indicates a specific basic service set ID (BSSID) in which an RU allocation may be used.

18. A method, comprising:

exchanging a resource unit (RU) Usage Agreement with a second electronic device of N peer devices, wherein the electronic device can process N RUs at a time, where N is an integer;

receiving, from an access point, a trigger frame that identifies an RU allocated to the electronic device for transmitting infrastructure traffic to the access point;

determining, based at least on an RU usage policy comprising the RU Usage Agreement, whether to use the allocated RU to transmit peer-to-peer (P2P) traffic to the second electronic device; and transmitting, based at least on the determination, the P2P traffic to the second electronic device utilizing the allocated RU.

19. The method of claim 18, wherein the method further comprises:

receiving a first indication from the access point of a P2P concurrency capability; and transmitting a second indication to the access point that the electronic device is capable of P2P operation using uplink (UL) multi-user (MU) communications.

20. The method of claim 19, the method further comprises:

transmitting a buffer status report (BSR) to the access point that indicates a presence of second P2P traffic; and receiving a second trigger frame based at least in part on the BSR, wherein the second trigger frame indicates that a second RU is allocated to be used for the second P2P traffic.

* * * * *